J. KINTZ.

DRAWER-PULLS.

No. 7,054. Reissued April 11, 1876.

WITNESSES:

C. Newna

John Goethals.

INVENTOR:

J. Kintz

BY Munn & Co

ATTORNEYS.

N. PETERS, PHOTO-LITHOGRAPHER, WASHINGTON, D. C.

UNITED STATES PATENT OFFICE

JOSEPH KINTZ, OF WEST MERIDEN, CONNECTICUT, ASSIGNOR TO HIMSELF AND PATRICK J. CLARK, OF SAME PLACE.

IMPROVEMENT IN DRAWER-PULLS.

Specification forming part of Letters Patent No. 112,816, dated March 21, 1871; reissue No. 7,054, dated April 11, 1876; application filed March 13, 1876.

*To all whom it may concern:*

Be it known that I, JOSEPH KINTZ, of West Meriden, in the county of New Haven and State of Connecticut, have invented a new and Improved Drawer-Pull, of which the following is a specification:

This invention relates to improvements in that class of drawer-pulls in which the handles are jointed to a shank so as to hang downward therefrom, the shank being attached to the drawer; and it consists in the employment of a ball-and-socket joint for connecting the handle to the socketed part, which is on the shank in this example, having a notch at the lower side, into which the stem which connects the ball with the handle swings when suspended. The invention also consists in the construction of the escutcheon-plate of the shank to which the handle is connected of an iron or other cheap metal base, and a covering of thin soft metal, spun upon or otherwise attached to the base, and having the socket for the ball formed on or attached to it.

Figure 1:
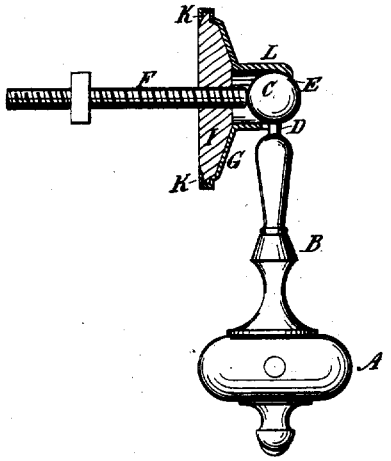
Figure 2:
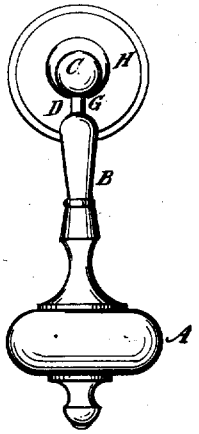

Figure 1 is a section of the escutcheon-plate and socket, and side view of the handle, and Fig. 2 is a front elevation.

Similar letters of reference indicate corresponding parts.

A is a knob-handle, which may be of any kind, with a stem, B, to which I attach a ball, C, preferably by a neck, D, as small as may be and preserve the requisite strength. This ball, which is spherical, is fitted into and confined in the socket E in the shank F, the connection being in the same way the ball-and-socket joint are usually made; but in addition thereto, in order to admit of the handle hanging vertically, I provide the notch G in the lower side of the cup, forming the socket for the neck D to swing into. As this construction requires a metal back to the escutcheon-plate H, to give strength and solidity, I propose to make the same of cheap cast metal, I, and cover it with a brass or other soft-metal cap, which I prefer to attach by spinning the edge over the edge of the back, which I provide with an annular rabbet, K, on the inner face, to make room for the edge of the cap, which is fitted into it. The socket for the ball is formed of a ferrule or short tube, L, of metal, attached to the center of this cap or inserted in a hole through it, and fastened by soldering, brazing, or otherwise; or it may be made by casting a piece with a socket and attaching it; or it may be formed in the cap by stamping it out. It is obvious that the ball may be attached to the shank and the socket to the handle, which I intend to do, if preferred.

Having thus described my invention, I claim as new and desire to secure by Letters Patent—

1. The improved drawer-pull, having the handle attached to the shank by a ball-and-socket joint, the socketed part having the notch G, to admit the stem D of the handle and allow it to hang vertically, all substantially as specified.

2. The socketed escutcheon-plate of the shank, consisting of the metal back I and sheet-metal front, the latter having the socket either formed out of it or of another piece, and attached and secured to the metal back I by turning the edge of the front inward and upon said metal back I, all substantially as specified.

JOSEPH KINTZ.

Witnesses:
H. B. PLUMB,
JAMES P. PLATT.